May 5, 1942.　　　F. B. PEEBLES　　　2,281,794
TROLLEY FOR OVERHEAD CONVEYING SYSTEMS
Filed May 11, 1940　　　3 Sheets-Sheet 1

Inventor.
Frank B. Peebles.
By Thiess, Olsen & Mecklenburger
Attys.

May 5, 1942.      F. B. PEEBLES      2,281,794
TROLLEY FOR OVERHEAD CONVEYING SYSTEMS
Filed May 11, 1940      3 Sheets-Sheet 2
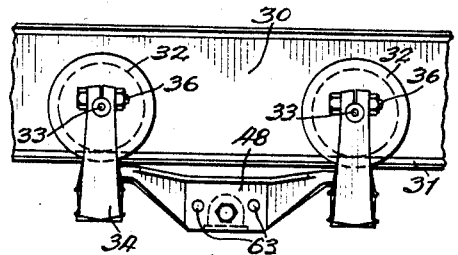
Fig. 9.
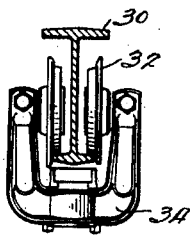
Fig. 10.
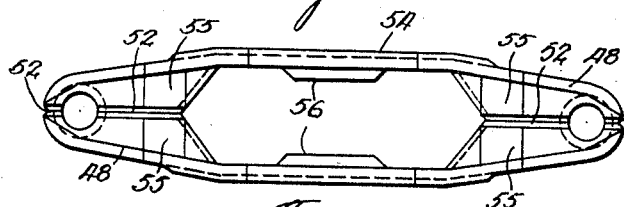
Fig. 11.
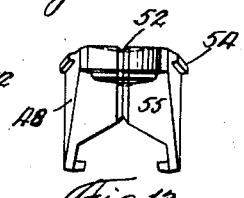
Fig. 13.
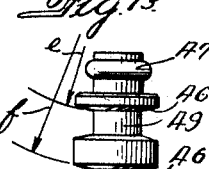
Fig. 15.
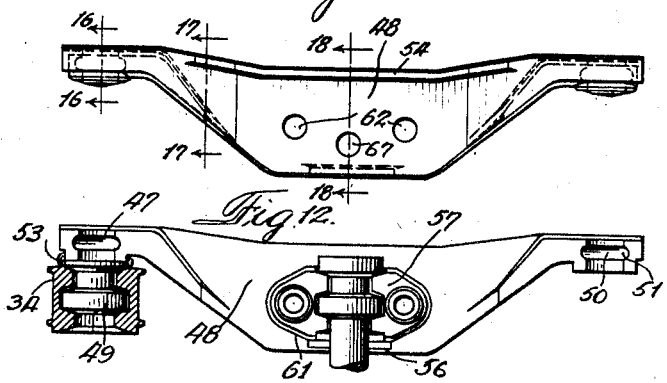
Fig. 12.
Fig. 14.
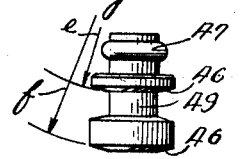
Fig. 16.
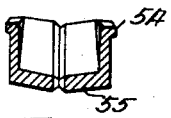
Fig. 17.
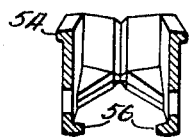
Fig. 18.
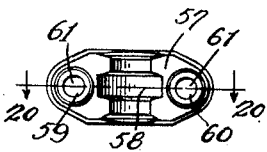
Fig. 19.
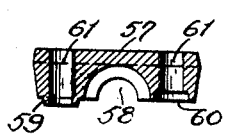
Fig. 20.
Inventor.
Frank B. Peebles.
By Thiess, Olson & Mecklenburger
Attys.

Inventor:
Frank B. Peebles
By Thiess, Olsen & Mecklenburg
Attys.

Patented May 5, 1942

2,281,794

UNITED STATES PATENT OFFICE 2,281,794

TROLLEY FOR OVERHEAD CONVEYING SYSTEMS

Frank B. Peebles, Fairfield, Iowa, assignor to The Louden Machinery Company, Fairfield, Iowa, a corporation of Iowa Application May 11, 1940, Serial No. 334,507

17 Claims. (Cl. 105—152)

My invention relates to improvements in trolleys for overhead conveying systems wherein the load to be conveyed is supported from the trolley and the wheels on the trolley move along flanges on an overhead track. These trolleys can be assembled for use as a two-wheel, four-wheel or eight-wheel unit, depending on the weight of the load to be carried. In starting, stopping, accelerating or decelerating the load-supporting trolley and in going around curves there is a tendency for the load to swing with respect to the trolley. This necessitates a load-supporting construction which will enable a swinging movement of the load without placing undue strain on the trolley.

One of the objects of my invention is to provide a trolley having a maximum degree of safety features to insure against accidental dropping of the load being conveyed.

A further object of my invention is to provide a load-supporting construction which will enable the load to have a swinging movement and in which a dual bearing surface is used to provide safety and ample bearing support.

A further object of my invention is to provide such a trolley in which the parts are highly standardized, are easily assembled at low cost and are interchangeable, with consequent low inventory requirements.

A further object of my invention is to provide a trolley so constructed that it has much flexibility in operation and long wearing life, and so that the load suspension parts thereof may be easily changed without disassembling the trolley.

A further object of my invention is to provide a trolley which can be assembled or disassembled wholly or in part while on the rail and one which will operate on vertical and lateral curves of a comparatively short radius.

Further objects and advantages will be apparent from the following description in conjunction with the accompanying drawings, in which—

Figure 1:
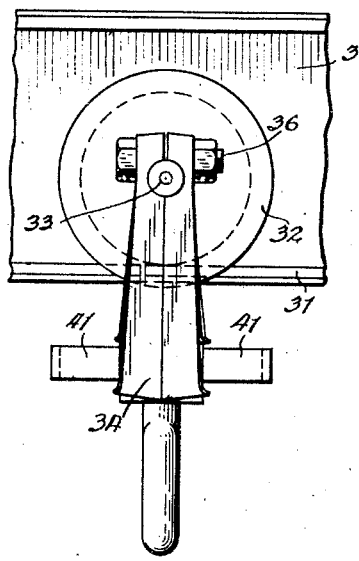
Figure 2:
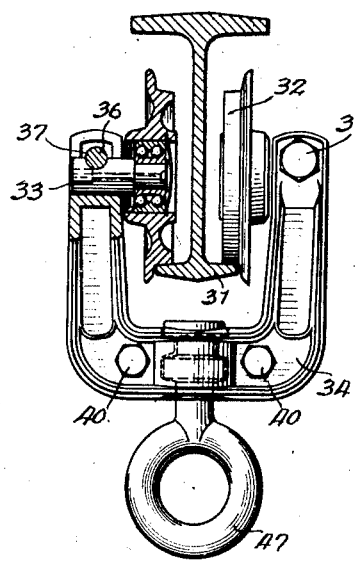
Figure 3:
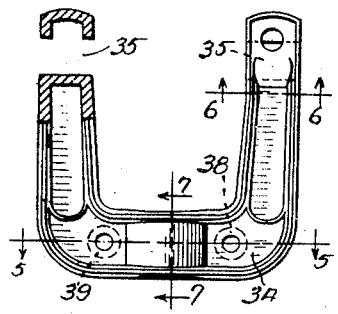
Figure 4:
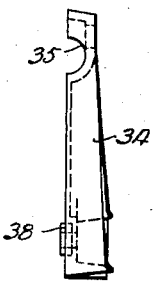
Figure 7:
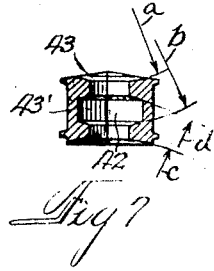
Figure 8:
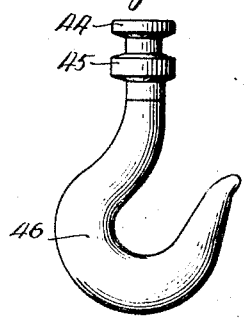
Figure 6:
Figure 21:
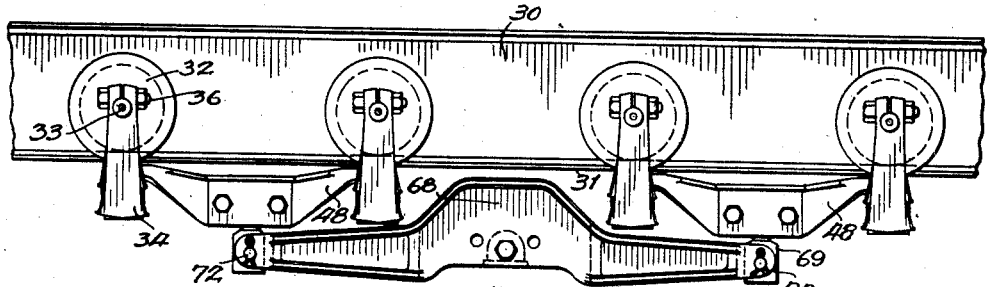
Figure 22:
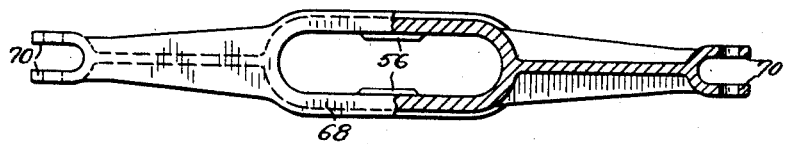
Figure 23:
Figure 24:
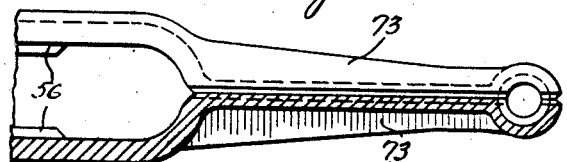
Figure 26:
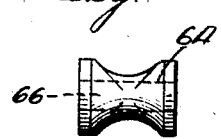
Figure 25:
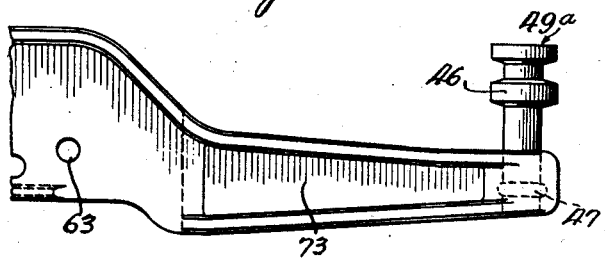
Figure 27:
Figure 28:
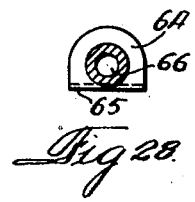
Figure 29:
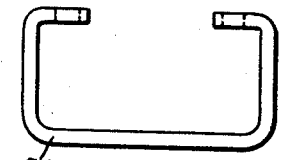

Figure 1 is a side view of a two-wheel trolley;
Fig. 2 is an end view of the two-wheel trolley;
Fig. 3 is a front view of the face of one of the yoke members, parts being broken away;
Fig. 4 is a side view of the yoke member;
Fig. 5 is a section taken on the line 5—5 of Fig. 3;
Fig. 6 is a section taken on the line 6—6 of Fig. 3;
Fig. 7 is an enlarged cross section of a swivel socket formed in the web portion of the yoke member taken on the line 7—7 of Fig. 3, the swivel being omitted;
Fig. 8 is a side view of a hook member;
Fig. 9 is a side view of a four-wheel trolley;
Fig. 10 is an end view of the four-wheel trolley;
Fig. 11 is a top view of the load bar connecting the yoke members;
Fig. 12 is a side view of the load bar;
Fig. 13 is an end view of the load bar;
Fig. 14 is a front view of the inside face of one of the members of the load bar showing a swivel block in section with a swivel head therein, and one end connection with the yoke members, the latter being shown in cross section;
Fig. 15 is a detail view of the swivel connecting the yoke and load bar members;
Fig. 16 is a section on the line 16—16 of Fig. 12;
Fig. 17 is a section on the line 17—17 of Fig. 12;
Fig. 18 is a section on the line 18—18 of Fig. 12;
Fig. 19 is a front view of the inside face of one of the swivel block members;
Fig. 20 is a section taken on the line 20—20 of Fig. 19;
Fig. 21 is a side view of an eight-wheel trolley;
Fig. 22 is a top view of the load bar connecting the trolley members, parts being broken away;
Fig. 23 is a detail view of a connecting member for the load bar and trolleys;
Fig. 24 is a top plan view of a different form of load bar;
Fig. 25 is a side view of the load bar of Fig. 24;
Fig. 26 is a top plan view of a spool member;
Fig. 27 is a side view of the spool member;
Fig. 28 is an end view of the spool member; and
Fig. 29 is a top view of a bumper member.

Referring to the drawings, these show a track 30 having lower flanges 31 on which the treads of trolley wheels 32 are adapted to run. The track is suspended from an overhead support by means of track hangers and as these hangers are in general use they are not shown in the drawings. The wheels are assembled on an axle 33 and the axle is supported in the upper ends of a yoke 34, all of which is well known in the art.

The yoke 34 consists of two identical members or halves bolted together to form a single wheel supporting frame. These members are preferably made of drop forgings, the cross section of each being in the form of a channel (Fig. 6), and in assembling the backs of the channels are together. The upper ends of each member are each provided with a semicircular groove 35 and when the two members of the yoke are fitted together the grooves form a complete circular housing for the axle 33. A clamping bolt 36 is passed through the adjacent ends of the yoke members at right angles to and immediately above the axle housing or, as is shown in the drawings (Fig. 2), the axle may be provided with a groove 37 and a bolt 36 placed therein which serves the purpose, when the yoke ends are drawn together, of holding the axle in a fixed relation to the rail and prevents it from turning.

Heretofore it has been a common practice to make yokes of two U or semi-circular sections bolted together with the toes in contact. The narrow surfaces of these toes and the comparatively great distance between the bearing points of the bolts, which hold the two parts in contact, and the clearance in the bolt holes made it very difficult, if not impossible, to prevent displacement of the two halves of the yokes. Considerable wearing and rubbing with consequent wear and distortion took place. To avoid these conditions, with my invention, a projecting boss 38 and a recess or socket 39 having matching dimensions are provided on each member or half. The boss and socket have holes centrally located therein through which clamping bolts 40 are placed when the halves are assembled. The two halves, each having one boss and socket thereon placed symmetrically about the center line with their centers on a line normal to the center line of the yoke, are alike and when the two halves are placed together back to back the boss on one half matches the socket in the other. These matching elements prevent slipping and rubbing together of the parts and protect the clamping bolts from stresses other than those set up by the simple clamping action. But one set of dies is needed for the yoke since both halves are the same hand and the interlocking thereof serves the purpose of maintaining alignment of the wearing surfaces in the swivel socket, which will be hereafter referred to. A bumper member 41, as shown in Fig. 29, may be secured on the yoke by means of the clamping bolts 40.

The central part of the webbed portion of each half of the yoke is provided with a recess forming half of a swivel socket 42 and when both halves of the yoke are assembled in matching position a complete socket will thereby be formed. Each halved portion of the socket has a semiannular formation 43 having an enlarged portion 43' central in the bottom of the yoke member. Four surfaces of the annular formation thus formed are spherical surfaces generated by radii which are concentric and in pairs, the center of one pair being above and the other below the yoke, thereby providing four spherical surfaces having radii $a$, $b$, $c$ and $d$, respectively (Fig. 7).

The purpose of these concentric spherical surfaces is to permit the use of a swivel head having two supporting flanges 44 and 45 (Fig. 8) on the shank of a load hook 46, load-eye 47 or other load-supporting attachment, said flanges having concentric spherical surfaces generated by the same radii $a$, $b$, $c$ and $d$, respectively, similarly located. A nonrigid connection between a trolley and a load is particularly desirable so that shock stresses set up in the trolley structure, due to inertia of the load and inequalities in the tread of the track, may be avoided.

Swivel heads having a single flange with a modified spherical bearing surface have heretofore been made, the spherical surface being necessary in order to prevent the swivel from pivoting on the outer edge of the head when the inertia of the load causes it to swing when moved. With swivel heads of this type having a single flange, the unit bearing pressures therein have been sufficiently high to cause rapid wear with a likelihood of a possible failure and consequent dropping of the load, and a high maintenance cost.

In my invention, with a swivel head having two load-supporting flanges with concentric spherical bearing surfaces and a socket having such surfaces, proper flexibility in the movement of the load can be provided with the wear and hazard of dropping the load largely eliminated. This form of swivel head also permits a flexibility in the connection between load bars and the yokes of trolleys which reduces the shock stresses in the yoke swivels and load bars set up by irregularities in track, such as uneven joints.

When loads greater than the capacity of a two-wheel trolley are to be conveyed, a four-wheel trolley is used and it consists of two two-wheel trolleys connected by a load bar 48. To conserve weight and keep the number of parts to a minimum while still retaining high carrying capacity, the load bar is made up of two identical members, also preferably drop forgings, and two swivels 49 with either a swivel block or a spool, which will be hereinafter referred to, in the center of the load bar for the purpose of supporting the load. The swivels 49 (Fig. 15) are provided with two concentric wearing surfaces 46 having radii $e$ and $f$, respectively, adapted to fit in the swivel sockets 42 of the yokes, and a bead 47 is provided on the shank of the swivel for attachment to the load bar.

Referring to Fig. 14, the contacting face of one of the load bar members is shown, having a swivel 49 in one end thereof seated in the socket of the yoke, the yoke being shown in cross section. Both ends of the load bar are provided with a recess 50 which is semicircular in form. Within the recess 50 is a groove 51 having a semicircular cross section. The recess 50 forms a semicircular housing for the shank of the swivel 49 and the bead 47 on the swivel fits in the groove 51. When two load bar members are assembled together, the recesses 50 form a complete housing encircling the shank of the swivel 49. The swivels are placed in position after which the two members are welded together along the V-shaped grooves 52 shown on the drawings. The swivel is then welded at 53 around the edge of the boss of the load bar and the upper bearing flange of the swivel. The bead on the shank of the swivel being completely enclosed and surrounded by the metal of the load bar members is held in place in such a manner that it cannot fall out or become separated even though the weld holding it to the bar and the swivel should fail.

The load bar is provided with a rib 54 extending along the outer upper edges thereof, and the portions adjacent to the ends thereof are channel shaped (Fig. 17) to strengthen the bar. The web part 55 of the channel so formed tapers off to the sides of the bar in order that a load-carrying member may be inserted between the sides of the bar. For the purpose of further insuring against accidents, I provide ledges 56 at the bottom and along the inner edges of each of the members of the bar. With devices of this kind ordinarily a swivel block or spool is placed between the sides of the bar and the load is carried therefrom, the block or spool being held in position by means of bolts of comparatively small diameter which are in double shear and support the suspended load.

I provide a swivel block 57 which is composed of two identical members, preferably made of drop forgings. A socket 58 identical to the socket 43 in the trolley yoke is formed in the block 57. Each half of block 57 is symmetrical about the center line of the inner or middle recess, and on this line and symmetrical about the axis of the socket are located a projecting boss 59 and a recess 60 having matching dimensions. The boss 59 and recess 60 function the same as the boss 38 and recess 39 on the trolley yoke which insures alignment of the bearing surfaces on the two members of the block and prevents independent movement thereof, thereby eliminating bending and shearing stresses in the clamping bolts. The boss 59 and recess 60 have holes 61 centrally located therein, and holes 62 are pierced in the sides of the load bar so that the clamping bolts 63 may be inserted therethrough and through the openings 61 in the swivel block. The swivel block rests on the ledges 56 and the bolts 63 serve no other purpose than to hold the swivel block in position and prevent spreading of the load bar.

The swivel block 57 being symmetrical about the line passing through the center of the middle groove and the clamping bolts 63 makes it possible to reverse the swivel block when a change is made from one swivel attachment to another, or when a worn swivel connection must be replaced. The bearing surfaces wear themselves into a fit and in no two cases is this wear likely to be the same. It is desirable to present a new surface to a new swivel and this is accomplished by turning the block over, allowing the new surfaces to wear themselves to a matched fit. Figs. 8, 2 and 23 show, respectively, a swivel hook, a swivel eye and a swivel shaft to be inserted in a clevis, all with two bearing flanges having concentric, spherical wearing surfaces.

Where head room is not important and the conveyed load has incorporated in its structure a hook for suspension purposes, the hook may be inserted through an eye in the swivel. When head room is insufficient to permit the use of a swivel eye, I provide a spool 64, as shown in Figs. 26, 27 and 28. The bottom side thereof has a flattened surface 65 which rests on the ledges 56 and the load is supported therein. An opening 66 extends through the spool which coincides with an opening 67 in the sides of the load bar, and the spool is held in place by means of a single clamping bolt inserted through the openings 66 and 67. When disassembling any part of the trolley, the load hook can be hooked over the spool or removed at any time.

An eight-wheel trolley is used when the load carrying capacity of a four-wheel trolley is insufficient, and it consists of two four-wheel trolleys connected together by a load bar 68. With a trolley of this capacity, either one of two forms of load bars may be used. The first form (shown in Figs. 21 and 22) is made up in one piece and has removable swivels 69. The ends 70 of the bar are in the form of a clevis and into these clevises so formed are fitted swivels having double spherical wearing surfaces adapted to fit in the swivel blocks on the four-wheel trolleys. The part 71 of the swivel that fits into the clevis is flattened and drilled and is connected to the clevis by means of a removable clevis pin 72. When it is desired to remove the swivel for any reason, it is only necessary to move the clevis pin and disassemble the swivel block in the four-wheel trolley. The second form of load bar (shown in Figs. 24 and 25) is made up of two identical members 73 having swivel heads identical with the heads in the four-wheel trolley. With this form of construction the members 73 are suspended from the swivels 49a, the bearing flanges 46 being seated in swivel blocks located in the four-wheel load bars. The ends of each member 73 are formed in a manner like the ends of the four-wheel load bar, each having a recess 50 which is semiannular in form and having a groove 51 which is semicircular in cross section, the recesses forming a complete housing for the shank of the swivel when the members are assembled. The bead 47 is assembled in the housing so formed and the members are then welded together in a manner like that used in assembling the four-wheel trolleys. The load-carrying point in the center of the bar 68 is constructed the same as the four-wheel trolley bar, with bolt holes for clamping bolts for either a swivel block or spool, and having ledges 56 for supporting the block or spool. The same swivel block or spool is used with this load bar as is used in the load bar of the four-wheel trolley.

It will thus be apparent that with my invention a load is suspended by means of double flanged swivels seated in sockets having double bearing surfaces. This provides a double wearing surface with a consequent prolonging of the wearing life of the swivel and reduction to a minimum of the likelihood of accidental dropping of a load. It also provides flexibility in operation, which permits the trolleys to move readily along the trackway and negotiate horizontal and vertical curves. The swivel sockets in the yokes and blocks being alike allow interchangeability of swivels in all three units, viz., two, four and eight-wheel units. The ledges 56 formed in the load bars sustain the entire weight of the load, thereby relieving the clamping bolts from shearing movement, as occurs when the bolts carry the load, and materially reduce the chances of the load falling on account of failure of the bolts. The bolts serve no other purpose than to hold the swivel block or spool in position and prevent spreading of the sides of the load bar. The parts of the trolleys are easily assembled and the load-carrying element (swivel blocks or spools) may be interchanged without disassembling the trolley in any way or removing it from the track by removing or inserting the swivel blocks or spools in the openings provided in the bottom of the load bars between the web portions 55 and the ledges 56.

Further modifications will be apparent to those skilled in the art and it is desired, therefore, that the invention be limited only by the prior art and the scope of the appended claims.

Having thus described my invention, what I claim and desire to secure by Letters Patent is:

1. A load-supporting beam construction comprising two similar halves separable substantially along an axial vertical plane, said half beams being provided with complementary load-supporting means intermediate their ends, each half beam having two bolt holes therethrough on opposite sides of the complementary load-supporting means and having a boss surrounding one bolt hole and a recess surrounding the other bolt hole, the boss of one half fitting in the recess of the other half.

2. A load-supporting yoke construction comprising a U-shaped hanger having means at the upper end of each arm for mounting a supporting wheel thereon, said U-shaped hanger comprising two similar halves separable substantially along a vertical plane through the axes of the wheels, the intermediate portions of said U-shaped half hangers being provided with complementary load-supporting means, each half hanger having two bolt holes therethrough on opposite sides of the complementary load-supporting means and having a boss surrounding one bolt hole and a recess surrounding the other hole, the boss of one half fitting in the recess of the other.

3. A load-supporting yoke construction comprising a U-shaped hanger having means at the upper end of each arm for mounting a supporting wheel thereon, said U-shaped hanger comprising two similar halves separable substantially along a vertical plane through the axes of the wheels, the intermediate portions of said U-shaped half hangers being provided with complementary load-supporting means, each half hanger having two bolt holes therethrough on opposite sides of the complementary load-supporting means and having a boss surrounding one bolt hole and a recess surrounding the other hole, the boss of one half fitting in the recess of the other, each half hanger being channeled in cross section and the back of one channel lying against the back of the other channel.

4. A yoke for an overhead trolley having its medial portion provided with a plurality of spaced, concentric, annular, upwardly-facing, spherical, bearing shoulders and a cooperating load-supporting member having a plurality of spaced, concentric, annular, downwardly-facing, spherical, bearing shoulders engaging said first concentric bearing shoulders and concentric therewith.

5. A load bar for an overhead trolley having its medial portion provided with a plurality of spaced, concentric, annular, upwardly-facing, spherical, bearing shoulders and a cooperating load-supporting member having a plurality of spaced, concentric, annular downwardly-facing, spherical, bearing shoulders engaging said first concentric bearing shoulders and concentric therewith.

6. A load bar for an overhead trolley having each end provided with a plurality of spaced, concentric, annular, downwardly-facing, spherical, bearing shoulders and a pair of load bar supporting members, each supporting member comprising a plurality of spaced, concentric, annular, upwardly-facing, spherical, bearing shoulders engaging the shoulders of the load bar, respectively, and concentric therewith.

7. A yoke for an overhead trolley having its medial portion provided with a plurality of spaced, concentric, annular, upwardly-facing, spherical, bearing shoulders and a cooperating load-supporting member having a plurality of spaced, concentric, annular, downwardly-facing, spherical, bearing shoulders engaging said first concentric bearing shoulders and concentric therewith, said yoke bearing shoulders comprising two mating portions separable along a plane through the axis of said annular shoulders.

8. A load bar for an overhead trolley having its medial portion provided with a plurality of spaced, concentric, annular, upwardly-facing, spherical bearing shoulders and a cooperating load-supporting member having a plurality of spaced, concentric, annular downwardly-facing, spherical, bearing shoulders engaging said first concentric bearing shoulders and concentric therewith, said load bar bearing shoulders comprising two mating portions separable along a plane through the axis of said annular shoulders.

9. A load bar for an overhead trolley having each end provided with a plurality of spaced, concentric, annular, downwardly-facing, spherical, bearing shoulders and a pair of load bar supporting members, each supporting member comprising a plurality of spaced, concentric, annular, upwardly-facing, spherical, bearing shoulders engaging the shoulders of the load bar, respectively, and concentric therewith, said supporting member shoulders comprising two mating portions separable along a plane through the axis of said annular shoulders.

10. A yoke for an overhead trolley having its medial portion provided with a plurality of spaced, concentric, annular, upwardly-facing, bearing shoulders and a cooperating load-supporting member having a plurality of spaced, concentric, annular, downwardly-facing, bearing shoulders engaging said first concentric bearing shoulders and concentric therewith.

11. A load bar for an overhead trolley having its medial portion provided with a plurality of spaced, concentric, annular, upwardly-facing, bearing shoulders and a cooperating load-supporting member having a plurality of spaced, concentric, annular downwardly-facing, bearing shoulders engaging said first concentric bearing shoulders and concentric therewith.

12. A load bar for an overhead trolley having each end provided with a plurality of spaced, concentric, annular, downwardly-facing, bearing shoulders and a pair of load bar supporting members, each supporting member comprising a plurality of spaced, concentric, annular, upwardly-facing, bearing shoulders engaging the shoulders of the load bar, respectively, and concentric therewith.

13. A yoke for an overhead trolley having its medial portion provided with a plurality of spaced, concentric, annular, upwardly-facing, bearing shoulders and a cooperating load-supporting member having a plurality of spaced, concentric, annular, downwardly-facing, bearing shoulders engaging said first concentric bearing shoulders and concentric therewith, said yoke bearing shoulders comprising two mating portions separable along a plane through the axis of said annular shoulders.

14. A load bar for an overhead trolley having its medial portion provided with a plurality of spaced, concentric, annular, upwardly-facing, bearing shoulders and a cooperating load-supporting member having a plurality of spaced, concentric, annular downwardly-facing bearing shoulders engaging said first concentric bearing shoulders and concentric therewith, said load bar bearing shoulders comprising two mating portions separable along a plane through the axis of said annular shoulders.

15. An overhead trolley construction comprising a horizontally-extending load bar, means for supporting the ends of a load bar, said bar having a recess having an entrance opening thereinto from the lower side of the bar in an intermediate portion thereof, said bar having two upwardly-facing load-supporting shoulders extending into said recess from opposite sides thereof, and means for supporting the load from said shoulders comprising a load-supporting block having two downwardly-facing shoulders engaging the upwardly-facing shoulders, respectively, said entrance opening being large enough to enable the passage of said load-supporting block therethrough into said recess to bring the downwardly-facing shoulders into engagement with the upwardly-facing shoulders.

16. An overhead trolley construction comprising a horizontally-extending load bar, means for supporting the ends of a load bar, said bar having a recess having an entrance opening thereinto from the lower side of the bar in an intermediate portion thereof, said bar having two upwardly-facing load-supporting shoulders extending into said recess from opposite sides thereof, said entrance opening being large enough to enable the passage of said load-supporting block therethrough into said recess to bring the downwardly-facing shoulders into engagement with the upwardly-facing shoulders, and means for supporting the load from said shoulders comprising a load-supporting block having two downwardly-facing shoulders engaging the upwardly-facing shoulders, respectively, said entrance opening being large enough to enable the passage of said load-supporting block therethrough into said recess to bring the downwardly-facing shoulders into engagement with the upwardly-facing shoulders, and means for holding said downwardly-facing shoulders against sliding movement longitudinally of the bar.

17. An overhead trolley construction comprising a horizontally-extending load bar, means for supporting the ends of a load bar, said bar having a recess having an entrance opening thereinto from the lower side of the bar in an intermediate portion thereof, said bar having two upwardly-facing load-supporting shoulders extending into said recess from opposite sides thereof, and means for supporting the load from said shoulders comprising a load-supporting block having two downwardly-facing shoulders engaging the upwardly-facing shoulders, respectively, said entrance opening being large enough to enable the passage of said load-supporting block therethrough into said recess to bring the downwardly-facing shoulders into engagement with the upwardly-facing shoulders, and means for holding said downwardly-facing shoulders against sliding movement longitudinally of the bar comprising a bolt extending through said bar and block.

FRANK B. PEEBLES.